(12) United States Patent
Bash et al.

(10) Patent No.: US 10,719,086 B2
(45) Date of Patent: Jul. 21, 2020

(54) SYSTEM AND METHOD FOR DYNAMICALLY UPDATED UNMANNED VEHICLE NAVIGATION PLANNING

(71) Applicant: Flytrex Aviation Ltd., Tel Aviv (IL)

(72) Inventors: Yariv Bash, Tel Aviv (IL); Amit Regev, Tel Aviv (IL)

(73) Assignee: Flytrex Aviation Ltd., Tel Aviv (IL)

( * ) Notice: Subject to any disclaimer, the term of this patent is extended or adjusted under 35 U.S.C. 154(b) by 137 days.

(21) Appl. No.: 15/649,133

(22) Filed: Jul. 13, 2017

(65) Prior Publication Data

US 2018/0017976 A1  Jan. 18, 2018

Related U.S. Application Data

(60) Provisional application No. 62/361,505, filed on Jul. 13, 2016.

(51) Int. Cl.
*G01C 22/00* (2006.01)
*G05D 1/00* (2006.01)
(Continued)

(52) U.S. Cl.
CPC ........... *G05D 1/104* (2013.01); *G05D 1/0088* (2013.01); *G05D 1/0204* (2013.01);
(Continued)

(58) Field of Classification Search
CPC ........ G05D 1/104; G05D 1/042; G05D 13/00; G05D 1/0088; G05D 1/0204; G08G 5/0008; G08G 5/0021; G08G 5/0039; G08G 5/0069; G08G 5/0052; G08G 5/0034; G08G 5/04
(Continued)

(56) References Cited

U.S. PATENT DOCUMENTS 8,612,136 B2  12/2013  Levine et al.
8,718,910 B2   5/2014  Guéziec
(Continued)

FOREIGN PATENT DOCUMENTS

WO     2015061008 A1     4/2015

OTHER PUBLICATIONS

The European Search Report for EP Application No. 17837369.2, The European Patent Office, The Hague: dated Jan. 23, 2020.

*Primary Examiner* — Mahmoud S Ismail
(74) *Attorney, Agent, or Firm* — M&B IP Analysts, LLC (57) ABSTRACT

A system and method for dynamically updated vehicle navigation planning for a second UV based on navigation feedback of a first UV. The first UV navigates based on a first navigation plan and the second UV navigates based on a second navigation plan. The system includes: a processing circuitry; and a memory, the memory containing instructions that, when executed by the processing circuitry, configure the system to: receive the navigation feedback of the first UV, wherein the navigation feedback of the first UV includes telemetry data indicating at least a divergence event and a location of the divergence event, wherein the divergence event is a divergence of the first UV from the first navigation plan; and dynamically update the second navigation plan based on the navigation feedback of the first UV when the second navigation plan includes the location of the divergence event.

12 Claims, 5 Drawing Sheets

(51) Int. Cl.

| | | |
|---|---|---|
| *G05D 1/10* | (2006.01) | |
| *G05D 1/02* | (2020.01) | |
| *G08G 5/00* | (2006.01) | |
| *H04L 29/08* | (2006.01) | |
| *G05D 3/00* | (2006.01) | |
| *G06F 7/00* | (2006.01) | |
| *G06F 17/00* | (2019.01) | |
| *G01C 23/00* | (2006.01) | |
| *B64C 39/02* | (2006.01) | |

(52) U.S. Cl.
CPC ......... *G08G 5/0008* (2013.01); *G08G 5/0021* (2013.01); *G08G 5/0039* (2013.01); *G08G 5/0052* (2013.01); *G08G 5/0069* (2013.01); *H04L 67/12* (2013.01); *B64C 39/024* (2013.01); *B64C 2201/141* (2013.01); *G05D 1/0206* (2013.01); *G05D 1/0291* (2013.01); *G08G 5/0091* (2013.01)

(58) Field of Classification Search
USPC .................................................. 701/26, 3, 2
See application file for complete search history.

(56) References Cited

U.S. PATENT DOCUMENTS

| | | |
|---|---|---|
| 2010/0070124 A1 | 3/2010 | Yeager et al. |
| 2015/0379874 A1 | 12/2015 | Ubhi et al. |
| 2016/0068264 A1 | 3/2016 | Ganesh et al. |
| 2016/0070264 A1* | 3/2016 | Hu ....................... G08G 5/0069 701/2 |
| 2016/0189549 A1* | 6/2016 | Marcus ................ G08G 5/0034 701/3 |

* cited by examiner

SYSTEM AND METHOD FOR DYNAMICALLY UPDATED UNMANNED VEHICLE NAVIGATION PLANNING

CROSS-REFERENCE TO RELATED APPLICATIONS

This application claims the benefit of U.S. Provisional Application No. 62/361,505 filed on Jul. 13, 2016, the contents of which are hereby incorporated by reference.

TECHNICAL FIELD

The present disclosure relates generally to unmanned vehicles, and more particularly to updating navigation plans for multiple unmanned vehicles.

BACKGROUND

Unmanned vehicles (UVs) are seeing increased industry use as improvements in fields such as artificial intelligence, battery life, and computation are made. UVs may be used for purposes such as photography and delivery. As an example, companies such as Amazon® are increasingly using UVs such as drones to deliver packages. As a result, some companies will likely begin to utilize hundreds or thousands of UVs at once to provide services.

Control over UVs may be complicated, due in part to a need to balance autonomous control with manual control. One particular use for UVs is controlling a fleet of UVs simultaneously, where control becomes exponentially more complicated. Manual control of each and every UV may be undesirable due to, e.g., excessive labor costs, human error, and the like.

As a result of the rapid adoption of UVs, regulators are scrambling to adapt to technological breakthroughs, with safe navigation becoming an increasingly important issue. Navigation of civilian UVs over long distances, especially without line of sight, makes it difficult for pilots to optimize their trajectory due to hazards and other in-flight events. These challenges and others result in less efficient navigation. These inefficiencies may be minor with respect to a single UV's flight path, but can result in significant accumulated inefficiencies when multiple UVs are used.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a system for dynamically updated unmanned vehicle navigation planning for a second UV based on navigation feedback of a first UV. The first UV navigates based on a first navigation plan and the second UV navigates based on a second navigation plan. The system comprises: a processing circuitry; and a memory, the memory containing instructions that, when executed by the processing circuitry, configure the system to: receive the navigation feedback of the first UV, wherein the navigation feedback of the first UV includes telemetry data indicating at least a divergence event and a location of the divergence event, wherein the divergence event is a divergence of the first UV from the first navigation plan; and dynamically update the second navigation plan based on the navigation feedback of the first UV when the second navigation plan includes the location of the divergence event.

Certain embodiments disclosed herein also include a non-transitory computer readable medium having stored thereon instructions for causing a processing circuitry to perform a process, the process comprising: constantly receiving, in real-time, navigation feedback of a first unmanned vehicle (UV), wherein the first UV navigates based on a first navigation plan, wherein the navigation feedback of the first UV includes telemetry data indicating at least a divergence event and a location of the divergence event, wherein the divergence event is a divergence of the first UV from the first navigation plan; and dynamically updating a second navigation plan based on the navigation feedback captured by the first UV when the second navigation plan includes navigating through the location of the divergence event, wherein a second UV navigates based on the second navigation plan.

Certain embodiments disclosed herein also include a method for dynamically updated unmanned vehicle navigation planning for a second UV based on navigation feedback of a first UV. The first UV navigates based on a first navigation plan and the second UV navigates based on a second navigation plan. The method comprises: receiving the navigation feedback of the first UV, wherein the navigation feedback of the first UV includes telemetry data indicating at least a divergence event and a location of the divergence event, wherein the divergence event is a divergence of the first UV from the first navigation plan; and dynamically update the second navigation plan based on the navigation feedback of the first UV when the second navigation plan includes the location of the divergence event.

Certain embodiments disclosed herein also include a system for dynamically updated unmanned vehicle navigation planning for a second UV based on navigation feedback of a first UV. The first UV navigates based on a first navigation plan and the second UV navigates based on a second navigation plan. The system comprises: a processing circuitry; and a memory, the memory containing instructions that, when executed by the processing circuitry, configure the system to: constantly receive, in real-time, the navigation feedback of the first UV, wherein the navigation feedback of the first UV includes telemetry data indicating at least a divergence event and a location of the divergence event, wherein the divergence event is a divergence of the first UV from the first navigation plan; and dynamically update the second navigation plan based on the navigation feedback captured by the first UV when the second navigation plan does not include navigating through the location of the divergence event, wherein the updated second navigation plan includes navigating through the location of the divergence event.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for dynamically updated unmanned vehicle (UV) navigation planning. A first navigation plan is generated for a first UV. Navigation feedback is received from the first UV. The navigation feedback may include telemetry data indicating a divergence from the first navigation plan, a divergence location at which the first UV diverged from the first navigation plan, a timestamp, and the like. A second navigation plan is generated for a second UV. Based on the navigation feedback of the first UV, the second navigation plan is dynamically updated. The updated second navigation plan may include navigating around the divergence event location or otherwise avoiding obstacles at the divergence event location, or may include navigating to the divergence event location in order to utilize the divergence event for more efficient navigation.

It should be noted that the embodiments disclosed herein allow for more efficient navigation by multiple UVs than, for example, statically setting a navigation path for each UV prior to navigation. In particular, the disclosed embodiments may be utilized to update UV navigation plans in real-time so as to allow UVs to avoid obstacles encountered by other UVs. Moreover, some embodiments disclosed herein may result in further increased efficiency of navigation by updating navigation plans in real-time to benefit from environmental conditions. For example, a navigation plan for a second UV navigating East may be dynamically updated to include moving to a location in which a first UV encountered wind blowing East, thereby propelling the second UV East using the Eastward-blowing wind.

Figure 1:
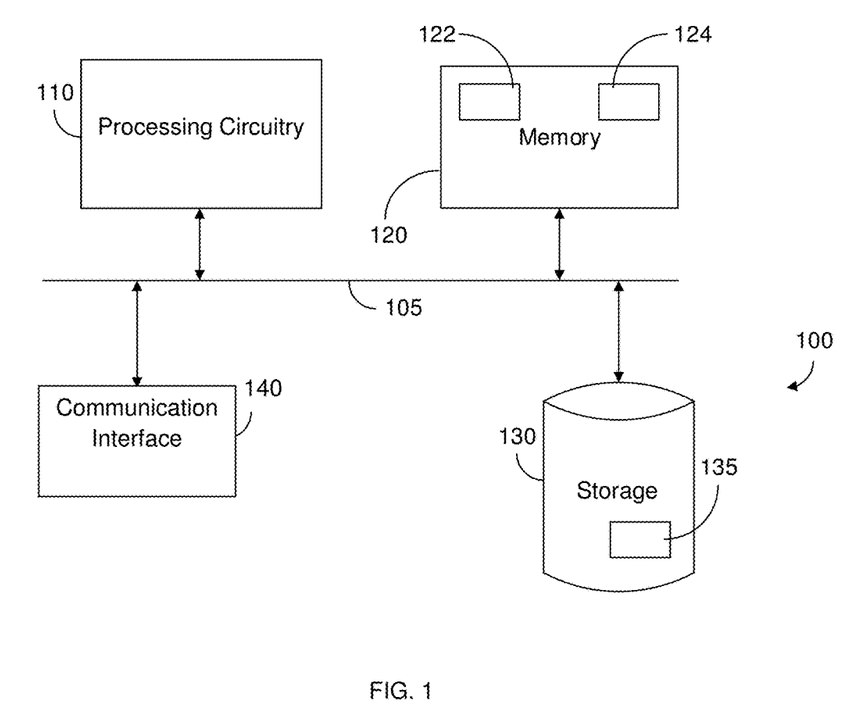
FIG. 1 is a schematic diagram of a navigation planning system according to an embodiment.

FIG. 1 shows an example schematic diagram of a navigation planning system 100 according to an embodiment. The navigation planning system 100 includes a processing circuitry 110, a memory 120, a storage 130, and a communication interface 140. In an embodiment, the components of the navigation planning system 100 may be communicatively connected via a bus 105.

The processing circuitry 110 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 120 may be volatile (e.g., RAM, etc.), non-volatile (e.g., ROM, flash memory, etc.), or a combination thereof. The memory 120 may further be used as a working scratch pad for the processing circuitry 110, as a temporary storage, and the like. Computer readable instructions to implement one or more embodiments disclosed herein may be stored in the storage 130.

The memory 120 may include a first memory portion 122 for storing software. Software shall be construed broadly to mean any type of instructions, whether referred to as software, firmware, middleware, microcode, hardware description language, or otherwise.

Instructions may include code (e.g., in source code format, binary code format, executable code format, or any other suitable format of code). The instructions, when executed by the processing circuitry, cause the processing circuitry 110 to perform the various processes described herein. Specifically, the instructions, when executed, cause the processing circuitry 110 to at least dynamically coordinate navigation plans for multiple UVs.

In yet another embodiment, the memory 120 includes a second memory portion 124 having stored thereon navigation feedback received from at least one UV. The navigation feedback may include telemetry data related to navigation by the UV. Specifically, the navigation data may include, but is not limited to, divergences from navigation paths, locations of divergences, times, and the like.

The storage 130 may be magnetic storage, optical storage, and the like, and may be realized, for example, as flash memory or other memory technology, CD-ROM, Digital Versatile Disks (DVDs), or any other medium which can be used to store the desired information. The storage 130 may store instructions for causing processing circuitries to execute the methods described herein, and the like. In some embodiments, the storage 130 further includes a storage portion 135. The storage portion 135 may store therein navigation plans for one or more UVs.

The communication interface 140 allows the navigation planning system 100 to communicate with, for example, UVs, or a combination thereof, for purposes such as sending navigation plans and receiving telemetry data. The network interface 140 may be a wireless connection, for example over a network.

It should be understood that the embodiments described herein are not limited to the specific architecture illustrated in FIG. 1, and other architectures may be equally used without departing from the scope of the disclosure.

Figure 2A:
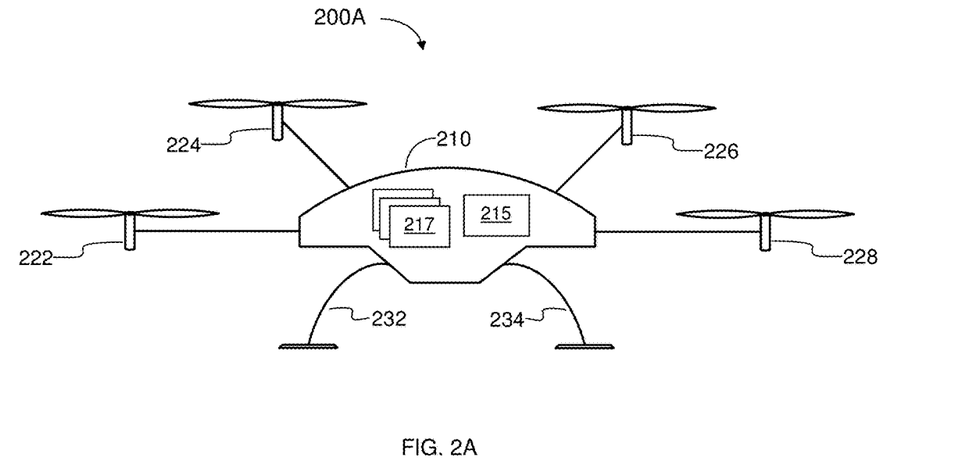
FIG. 2A is a schematic diagram of an unmanned aerial vehicle.

FIG. 2A is an example schematic diagram of an unmanned aerial vehicle (UAV) 200 that may be provided UV navigation plans in accordance with various disclosed embodiments. In an example implementation, the UAV 200 receives navigation plans from and sends telemetry data to the navigation planning system 100, FIG. 1.

The UAV 200 includes a body 210 coupled to a first rotor 222, a second rotor 224, a third rotor 226, and a fourth rotor 228. The UAV may further include a first landing skid 232 and a second landing skid 234.

The body 210 houses a controller 215 configured to control locomotion of the UAV 200 based on one or more navigation plans. The controller 215 may be coupled to a communication circuit (not shown) for communicating with a control server such as the navigation planning system 100. The communication circuit allows for communications such as, but not limited to, sending telemetry data, receiving navigation plans, and the like.

In the example diagram shown in FIG. 2A, the body further includes sensors 217. The sensors 217 may include, but are not limited to, a camera, a microphone, a global positioning system (GPS), an accelerometer, a gyroscope, a magnetometer, a proximity sensor, an anemometer, a wind vane, a light sensor, a barometer, a thermometer, a radiation sensor, and the like. The sensors 217 may be utilized to collect telemetry data related to navigation by the UAV 200 such as, for example, geographical location, direction, acceleration, orientation, speed, wind speed, wind direction, and the like.

In an example implementation, a first pair of rotors (e.g., the first rotor 222 and the third rotor 226) rotate in clockwise, and a second pair of rotors (e.g., the second rotor 224 and the fourth rotor 228) rotate counterclockwise. The rotors may have a fixed position. Height, pitch, yaw, and roll of the UAV may be adjusted by applying a thrust to each rotor.

The landing skids 232 and 234 may be equipped with dampers 236. The dampers 236 assist in shock absorption from landing the UAV 200, thereby allowing for protection of at least a payload (e.g., the payload 240, FIG. 2B) and the controller 215.

Figure 2B:
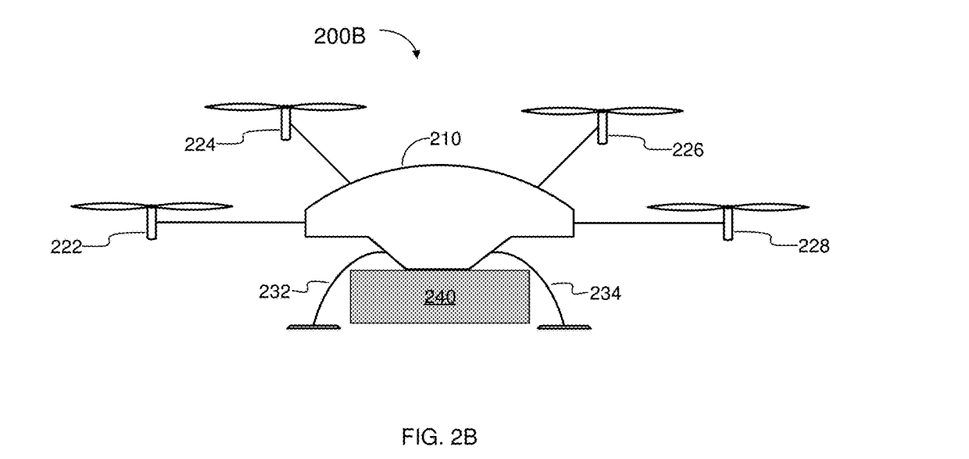
FIG. 2B is a schematic diagram of an unmanned aerial vehicle and a payload.

FIG. 2B is an example schematic diagram of the UAV 200 equipped with a payload 240. In the example schematic diagram of FIG. 2B, the payload 240 is affixed to a bottom portion of the UAV 200.

It should be noted that the UAV 200 is merely an example UV and that UVs whose navigation may be dynamically coordinated according to the disclosed embodiments are not limited to the specific architecture illustrated in FIGS. 2A and 2B. Specifically, different numbers of sensors, rotors, landing skids, or other components may be equally utilized.

It should be further noted that navigation of UVs other than UAVs may be equally coordinated without departing from the scope of the disclosure. Even further, navigation may be coordinated between a UAV and another type of UV without departing from the scope of the disclosure. For example, navigation plans for a UAV may be updated based on telemetry data indicating strong wind that is received from a ground-based UV (e.g., an autonomous car). Example UVs may include unmanned or uncrewed vehicles such as, but not limited to, an unmanned ground vehicle (e.g., an autonomous car), an unmanned aerial vehicle or unmanned combat aerial vehicle (e.g., a drone), an unmanned surface vehicle, an autonomous underwater vehicle or unmanned undersea vehicle, an unmanned spacecraft, and the like.

Figure 3A:
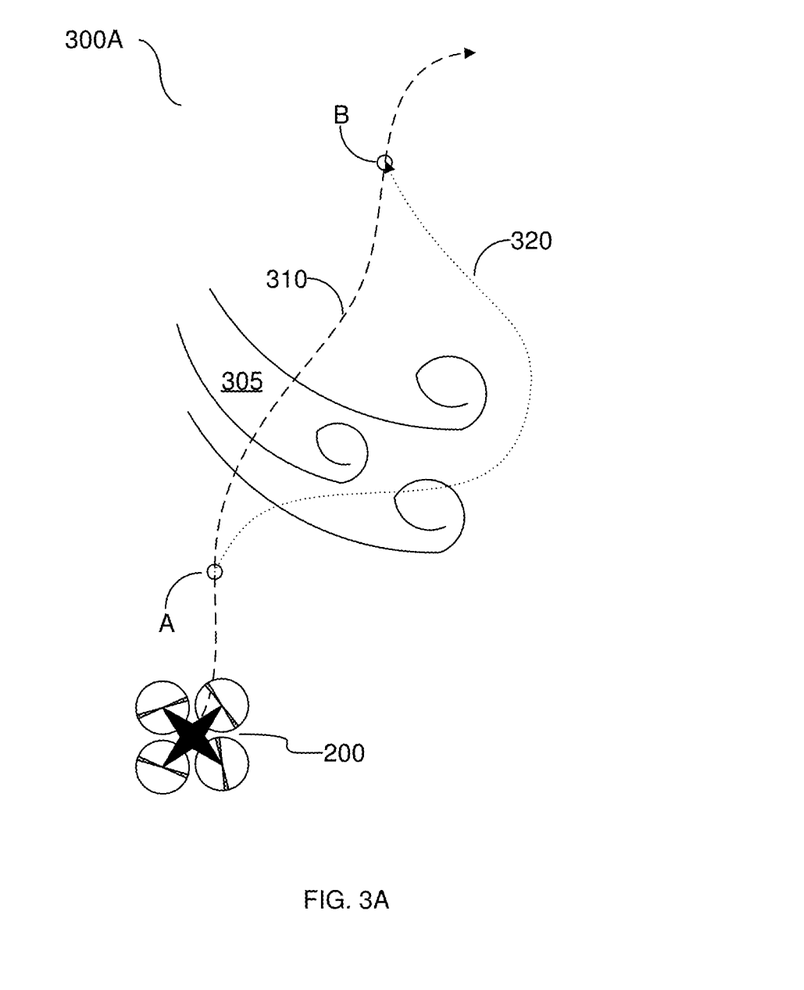
FIG. 3A is an illustration of an unmanned aerial vehicle following a navigation plan

FIG. 3A is an illustration 300A of the UAV 200 following a navigation plan. The illustration 300A includes the UAV 200 moving along a flight trajectory 310 indicated in a navigation plan (e.g., a navigation plan received from the Navigation planning system, not shown). At a location "A" on the flight trajectory 310, the UAV 200 encounters a strong gust of wind 305.

In some circumstances, the UAV 200 may apply additional thrust in order to counter the gust of wind 305 and, thus, prevent divergence from the trajectory 310. However, this may consume more power than navigating an alternative flight trajectory 320 and returning to a point B on the trajectory 310. During navigation, the UAV 200 is configured to send, to the navigation planning system 100, telemetry data related to the movement along the trajectory 310 or 320. The telemetry data may be utilized to generate updated navigation plans for other UVs.

Figure 3B:
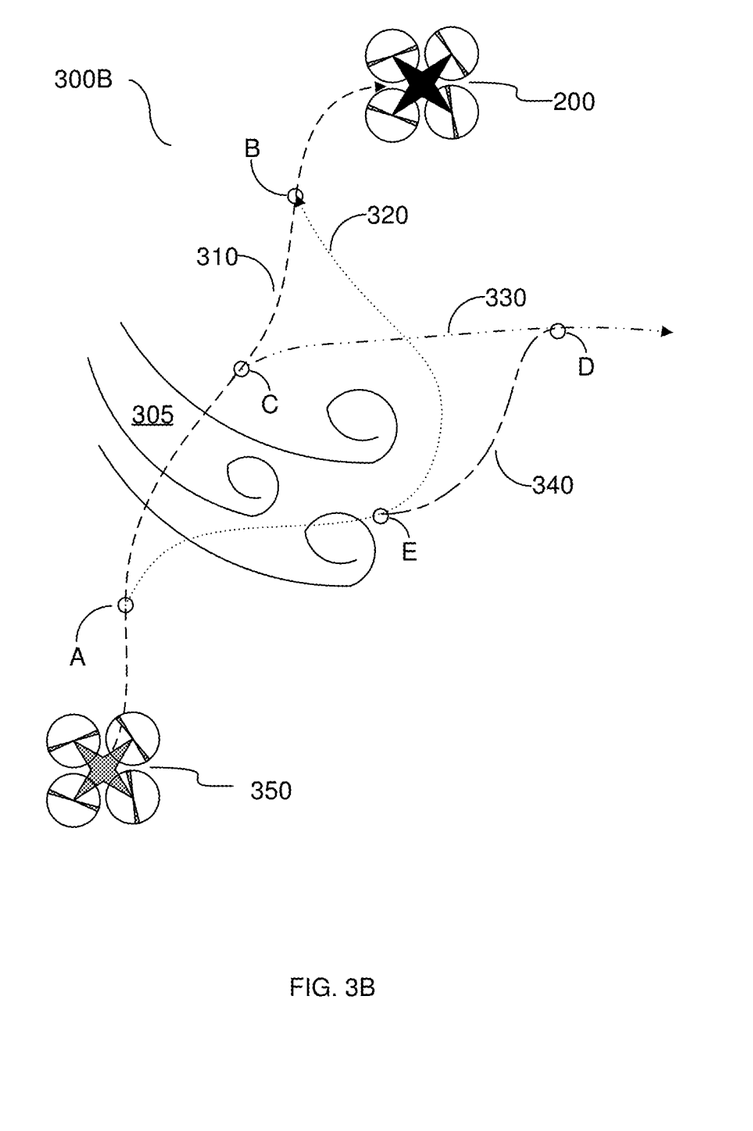
FIG. 3B is an illustration of an unmanned aerial vehicle receiving and executing an updated navigation plan.

As a non-limiting example, the telemetry data may include geographic locations of points A and B (i.e., the points at which the UAV 200 diverged from and converged on the trajectory 310, respectively), geographic locations indicating the divergence from the trajectory 310 (e.g., geographic locations of points along the trajectory 320) times (e.g., the times at which the UAV 200 reached point A and point B), wind direction of the gust of wind 305, wind speed of the gust of wind 305, and the like. The telemetry data values may be determined based on, for example, the additional amount of force required to be applied by the UAV 200 to counter the gust of wind 305. The geographic location of point A (e.g., the location of divergence) may be utilized to generate an updated navigation plan for another UV (e.g., the second UAV 350 as shown in FIG. 3B), thereby allowing the other UV to avoid the strong gust of wind 305. Alternatively, the geographic location of point A and the direction of the strong gust of wind may be utilized to generate an updated navigation plan for the other UV traveling in the same direction as the gust of wind 305, thereby allowing the other UV to navigate to point A and benefit from the gust of wind 305 (i.e., the gust of wind 305 blows in the same direction as the other UV is traveling, thereby accelerating the other UV).

FIG. 3B is an illustration 300B of a second UAV 350 receiving and executing an updated navigation plan. The second UAV 350 is configured to at least receive navigation plans from the navigation planning system 100 (not shown in FIG. 3B). Specifically, in an example, the second UAV 350 receives a second navigation plan including navigation through points "A," "C," and "D."

Upon receiving telemetry data related to the divergence of the first UAV 200 from the trajectory 310, the Navigation planning system 200 is configured to generate an updated navigation plan for the second UAV 350. The updated navigation plan includes navigation along a trajectory 340 and through points "A," "E," and "D." Rather than diverging from an original navigation plan including movement along trajectories 310 and 330, the UAV 350 moving according to the updated navigation plan may utilize the gust of wind 305 to a navigational advantage by allowing the force of the wind to, for example, replace a portion of the required thrust, thereby more efficiently navigating along the trajectory 340. The updated navigation plan may include merging the trajectory 340 with the trajectory 330 of the original navigation plan for the UAV 350 at location "D."

It should be noted that FIGS. 3A and 3B are illustrated and described as including navigation by the UAV 200 based on navigation plans generated by the navigation planning system 100 merely for simplicity purposes, and that the embodiments disclosed herein are not limited to the particular architectures of the UAV 200 and the navigation planning system 100.

Figure 4:
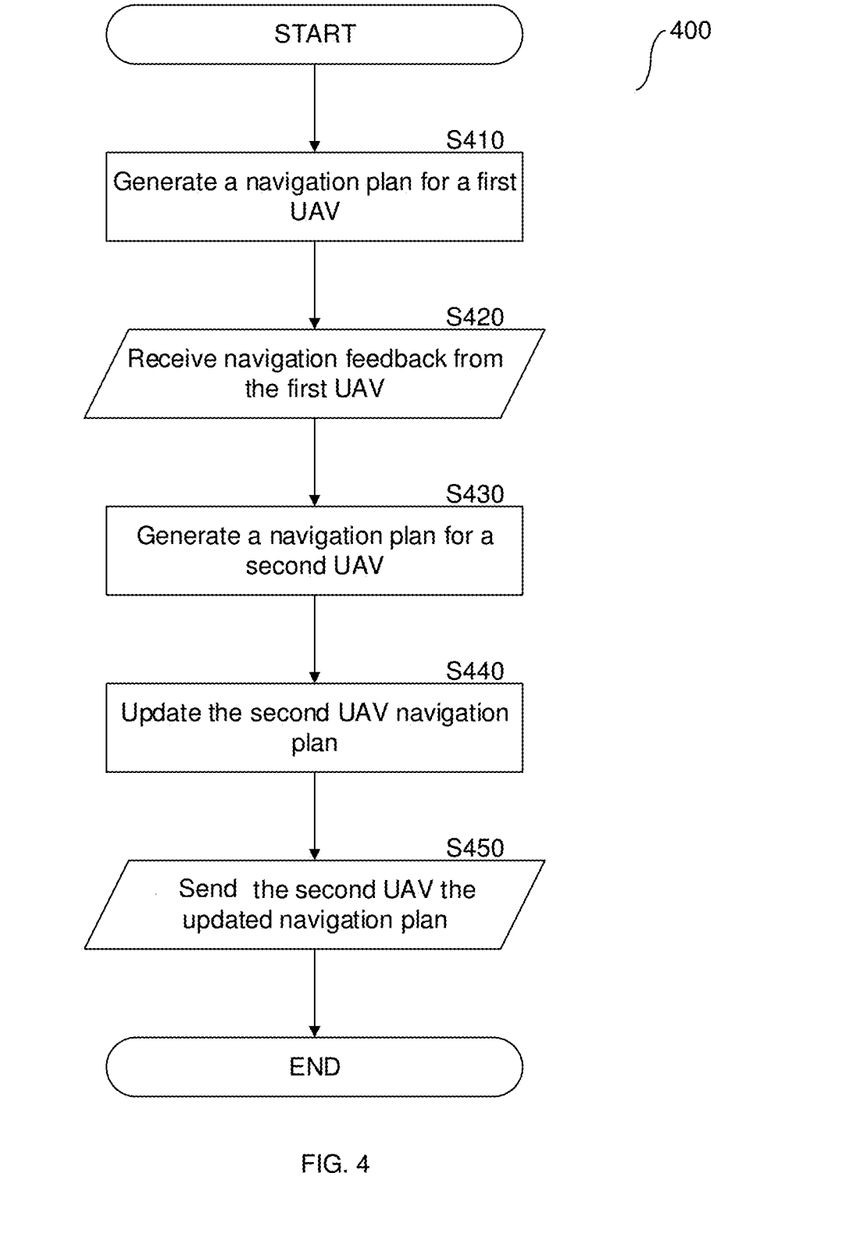
FIG. 4 is a flowchart illustrating a method for dynamically updated unmanned vehicle navigation planning according to an embodiment.

FIG. 4 is an example flowchart 400 illustrating a method for dynamically coordinated UV navigation planning according to an embodiment. In an embodiment, the method is performed by the navigation planning system 100, FIG. 1. In an example implementation, the method may be utilized to generate an updated navigation plan for the second UAV 350 based on navigation feedback received from the first UAV 200.

At S410, a navigation plan is generated for the first UAV 200. The navigation plan for the first UAV 200 may be generated based on, for example, a starting location and an ending location for navigation by the first UAV 200.

At S420, navigation feedback is received from the first UAV 200. The navigation feedback includes telemetry data captured by sensors of the first UAV 200 such as, but not limited to, geographical location, direction, acceleration, orientation, speed, wind speed, wind direction, and the like. The telemetry data may indicate, e.g., a divergence from the navigation plan for the first UAV 200, a location of the divergence, a time of the divergence, and the like. In an embodiment, S420 may further include receiving meteorological data.

The navigation feedback may be received in real-time during navigation from the first UAV 200. Further, the navigation feedback may be received constantly, i.e., repeatedly at predetermined time intervals. Receiving the navigation feedback constantly in real-time allows for identifying divergence events that are currently occurring or have recently occurred, thereby allowing for more accurate updating of the navigation plan for the second UAV 350, particularly with respect to temporary divergence events that may occur at a location only for short periods of time (e.g., passing thunderstorms or brief gusts of wind). Alternatively, the navigation feedback may be received subsequent to navigation by the first UAV 200 (e.g., when the first UAV 200 returns to a home location).

In an embodiment, S420 may include determining a type of divergence event that caused the divergence based on the navigation feedback. The type of the divergence event may be, but is not limited to, a temporary event or a permanent event. A temporary event may be a single occurrence event such as passing of a flock of birds (i.e., an event that does not affect other UVs and should not be used to generate updated navigation plans), or a non-single occurrence event such as wind or other weather conditions that may last for hours or days. A permanent event may be, but is not limited to, a non-moving obstacle such as a building or any other event that may affect navigation which does not change frequently (e.g., every few days). For example, a permanent event may occur when a height of a building has changed such that all subsequently generated navigation plans should account for the change.

Permanent events, single occurrence temporary events, and non-single occurrence temporary events may be defined with respect to telemetry data. Each definition of an event may include, for example, a temporal threshold and a counter. Which events to be utilized for generating updated navigation plans for the second UAV 350 may be determined based on the telemetry data received from the first UAV 200 as compared to the temporal threshold, the counter, or both.

In some implementations, the type of the divergence event is determined based on navigation feedback received from multiple UVs, aircrafts (e.g., planes, helicopters, etc.), or both. Determining the type of divergence event based on navigation feedback from multiple vehicles allows for more accurate determination of divergence events. For example, a divergence event indicated by motion sensor data may be a passing object (e.g., a bird) or may be a static object (e.g., a building). When the divergence event is a bird at a location, navigation feedback from multiple UVs navigating through that location will typically only indicate one instance of the divergence event at the location. When the divergence event is a building at a location, navigation feedback from multiple UVs navigating through the location will indicate multiple instances of the divergence event.

The types of divergence events may be determined further with respect to an area in which the divergence occurred. Each area includes multiple locations. Determining types of divergence events with respect to areas may allow for, e.g., updating navigation plans based on navigation feedback from multiple UVs. For example, based on navigation feedback indicating a lightning storm from one UV at a first location and navigation feedback that does not indicate a divergence event from another UV at a second location, an updated navigation plan for avoiding the first location by navigating through the second location may be generated.

In some embodiments, the cause of the divergence may be determined via a machine learning model using telemetry data from the first UAV 200 as inputs and providing event predictions as outputs. The machine learning model may be trained based on training telemetry data previously received from UVs, and may be further based on known training event data associated with the training telemetry data.

At S430, an original navigation plan is generated for the second UAV 350. The navigation plan for the second UAV 350 may be generated based on, for example, a starting location and an ending location for navigation by the second UAV 350.

At S440, based on the navigation feedback from the first UAV 200, an updated navigation plan may be generated, in real-time, for the second UAV 350. In an embodiment, S440 may include determining, based on the navigation feedback, a divergence event which caused the first UAV 200 to diverge from a trajectory of the navigation path generated at S410. The divergence event is associated with a location (i.e., as indicated by the telemetry data of the navigation feedback) such that the updated navigation plan may include either avoiding the divergence event location or navigating through the divergence event location. The navigation plan may be generated when the original navigation plan for the second UAV 350 includes navigating through the divergence event location and the divergence event is to be avoided by the second UAV 350. Alternatively, the generated when the original navigation plan for the second UAV 350 does not include navigating through the divergence event location and the divergence event is to be encountered by the second UAV 350 (e.g., when it is desirable to encounter the divergence event to, e.g., accelerate the second UAV 350).

The navigation feedback may be analyzed constantly (i.e., repeatedly at predetermined time intervals) to determine divergence events, thereby allowing for dynamic updating of navigation plans for the second UAV 350 based on divergence events occurring in real-time. The dynamic updating allows for increasing efficiency of navigation with respect to, for example, avoiding obstacles, utilizing existing sources for acceleration (e.g., wind), and the like.

In an embodiment, S440 may further include determining a type of divergence event and updating the navigation plan based on the determined type. The type of the divergence event may be a permanent event, a single occurrence temporary event, or a non-single occurrence temporary event, as described further herein above. The type of divergence event may further be a particular type of divergence event such as, for example, obstacles, weather conditions, construction, and the like. As a first example, the updated navigation plan may not be different from the original navigation plan when the divergence event is a flock of birds passing. As a second example, the updated navigation plan may be different from the original navigation plan when a current time is 3:00 PM PT and the divergence event is a storm occurring at 2:00 PM PST and estimated to continue until 5:00 PM PST. As a second example, the updated navigation plan may be different from the original navigation plan when the divergence event is a change in height of a building.

At S450, the updated navigation plan is sent, in real-time, to the second UAV 350 for implementation, thereby dynamically configuring the second UAV 350 to more efficiently navigate with respect to the divergence event.

It should be noted that the steps of the flowchart 400 are illustrated in the particular order shown in FIG. 4 merely for simplicity purposes and without limitation on the disclosed embodiments. Some of the steps may be performed in a different order or in parallel without departing from the scope of the disclosure. As a particular example, the navigation plans for the first UAV 200 and for the second UAV 350 may be generated in parallel, or the original navigation plan for the second UAV 350 (i.e., the plan generated at S430) may be generated prior to the navigation plan for the first UAV 200 and updated after the first UAV 200 begins moving in accordance with the navigation plan generated at S410. Further, the original navigation plan for the second UAV 350 may be generated based on the navigation feedback from the first UAV 200 such that the original navigation plan may include navigating so as to avoid or utilize an obstacle as described herein.

It should be further noted that the embodiments described herein above with respect to FIG. 4 are discussed with respect to updating navigation of the second UAV 350 based on navigation feedback received from the first UAV 200 merely for simplicity purposes and without limitations on the disclosed embodiments. Any UV configured to collect and send telemetry data may be utilized to generate updated navigation plans for any other UV configured to receive and implement navigation plans without departing from the scope of the disclosure. Further, navigation feedback from multiple first UVs may be utilized to update navigation plans for a second UV. Also, navigation feedback from a first UV may be utilized to update navigation plans for multiple second UVs.

It should be understood that various embodiments described herein above are discussed with respect to unmanned vehicles (UVs) and unmanned aerial vehicles (UAVs) merely for simplicity purposes and without limitation on the disclosed embodiments. Manned vehicles, robots, or any other system capable of controlled propulsion may be equally utilized without departing from the scope of the disclosure such that the solutions may provide navigation instructions for at least partially autonomous control of such other systems.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for dynamically updated navigation planning for a second unmanned vehicle (UV) based on navigation feedback of a plurality of first UVs, wherein each of the plurality of first UVs navigates based on a respective first navigation plan, wherein the second UV navigates based on a second navigation plan, comprising:

a processing circuitry; and a memory, the memory containing instructions that, when executed by the processing circuitry, configure the system to:

receive the navigation feedback of the plurality of first UVs, wherein the navigation feedback includes telemetry data indicating at least a divergence event and a location of the divergence event, wherein the divergence event is a divergence of at least one of the plurality of first UVs from its respective first navigation plan;

determine a type of the divergence event based on the navigation feedback of the plurality of first UVs, wherein the type of the divergence event is based further on a number of instances of the divergence event;

dynamically update the second navigation plan based on the navigation feedback and the type of divergence event when the second navigation plan includes the location of the divergence event; and send the updated second navigation plan to the second UV.

2. The system of claim 1, wherein the type of the divergence event is any one of: a permanent event, and a temporary event.

3. The system of claim 1, wherein the type of the divergence event is determined using a divergence event type model, wherein the divergence event type model is created based on machine learning using telemetry data of a plurality of fourth UVs as inputs.

4. The system of claim 1, wherein the updated second navigation plan includes navigating to avoid the location of the divergence event.

5. The system of claim 1, wherein portions of the navigation feedback of the first UV are constantly received in real-time.

6. A non-transitory computer readable medium having stored thereon instructions for causing a processing circuitry to perform a process, the process comprising:
   constantly receiving, in real-time, navigation feedback of a plurality of first unmanned vehicles (UVs), wherein each of the plurality of first UVs navigates based on a respective first navigation plan, wherein the navigation feedback of the first UV includes telemetry data indicating at least a divergence event and a location of the divergence event, wherein the divergence event is a divergence of at least one of the plurality of first UVs from the respective first navigation plan;
   determining a type of the divergence event based on the navigation feedback of the plurality of first UVs, wherein the type of the divergence event is based further on a number of instances of the divergence event;
   dynamically updating a second navigation plan based on the navigation feedback and the type of divergence event when the second navigation plan includes navigating through the location of the divergence event, wherein a second UV navigates based on the second navigation plan; and
   sending the updated second navigation plan to the second UV.

7. A method for dynamically updated navigation planning for a second unmanned vehicle (UV) based on navigation feedback of a plurality of first UVs, wherein each of the plurality of first UVs navigates based on a respective first navigation plan, wherein the second UV navigates based on a second navigation plan, comprising:
   constantly receiving, in real-time, the navigation feedback of plurality of first UVs, wherein the navigation feedback includes telemetry data indicating at least a divergence event and a location of the divergence event, wherein the divergence event is a divergence of at least one of the plurality of first UVs from its respective first navigation plan;
   determining a type of the divergence event based on the navigation feedback of the plurality of first UVs, wherein the type of the divergence event is based further on a number of instances of the divergence event;
   dynamically updating the second navigation plan based on the navigation feedback and the type of divergence event when the second navigation plan includes navigating through the location of the divergence event; and
   sending the updated second navigation plan to the second UV.

8. The method of claim 7, wherein the type of the divergence event is any one of: a permanent event, and a temporary event.

9. The method of claim 7, wherein the type of the divergence event is determined using a divergence event type model, wherein the divergence event type model is created based on machine learning using telemetry data of a plurality of fourth UVs as inputs.

10. The method of claim 7, wherein the updated second navigation plan includes navigating to avoid the location of the divergence event.

11. A system for dynamically updated navigation planning for a second unmanned vehicle (UV) based on navigation feedback of a plurality of first UVs, wherein each of the plurality of first UVs navigates based on a first navigation plan, wherein the second UV navigates based on a second navigation plan, comprising:
   a processing circuitry; and
   a memory, the memory containing instructions that, when executed by the processing circuitry, configure the system to:
   constantly receive, in real-time, the navigation feedback of the plurality of first UVs, wherein the navigation feedback includes telemetry data indicating at least a divergence event and a location of the divergence event, wherein the divergence event is a divergence of at least one of the plurality of first UVs from the respective first navigation plan;
   determining a type of the divergence event based on the navigation feedback of the plurality of first UVs, wherein the type of the divergence event is based further on a number of instances of the divergence event;
   dynamically update the second navigation plan based on the navigation feedback and the type of divergence event when the second navigation plan does not include navigating through the location of the divergence event, wherein the updated second navigation plan includes navigating through the location of the divergence event; and
   send the updated second navigation plan to the second UV.

12. The system of claim 11, wherein the divergence event is wind blowing in a direction, wherein the updated second navigation plan includes navigating through the location of the divergence event in the direction of the wind.

* * * * *